United States Patent [19]

Puszkar

[11] Patent Number: 5,626,008
[45] Date of Patent: May 6, 1997

[54] MULCHER ATTACHMENT FOR LAWN MOWER

[76] Inventor: Michael T. Puszkar, P.O. Box 75, Frontier, Saskatchewan, Canada, S0N 0W0

[21] Appl. No.: 423,832

[22] Filed: Apr. 18, 1995

[51] Int. Cl.$^6$ .................................. A01D 34/72
[52] U.S. Cl. .............. 56/17.5; 56/16.9; 56/17.3; 56/255; 56/295
[58] Field of Search .................. 56/17.5, 16.8, 56/16.9, 17.3, 255, 295, DIG. 17, DIG. 20

[56] References Cited

U.S. PATENT DOCUMENTS

| | | | |
|---|---|---|---|
| 2,859,581 | 11/1958 | Kroll et al. | 56/295 |
| 2,861,611 | 11/1958 | Considder | 146/124 |
| 2,920,436 | 1/1960 | Benson | 56/295 |
| 3,706,189 | 12/1972 | Rutherford | 56/13.4 |
| 3,908,913 | 9/1975 | Cushman | 241/10.7 |
| 3,908,914 | 9/1975 | Cushman | 241/101.7 |
| 3,963,184 | 6/1976 | Grimm | 241/101.1 |
| 3,998,037 | 12/1976 | Deans et al. | 56/295 |
| 4,057,952 | 11/1977 | Brokaw | 241/101.7 |
| 4,283,018 | 8/1981 | Richard | 241/101.1 |
| 4,369,618 | 1/1983 | Dell | 56/295 |
| 4,532,708 | 8/1985 | Mensing | 56/295 X |
| 4,686,819 | 8/1987 | Bryant | 56/295 |
| 4,796,416 | 1/1989 | Bendig et al. | 56/16.9 |
| 4,901,509 | 2/1990 | Leuz | 56/16.9 |
| 4,912,917 | 4/1990 | du Moulin | 56/16.9 |
| 4,951,449 | 8/1990 | Thorud | 56/2 |
| 4,969,321 | 11/1990 | Du Moulin | 56/16.9 |
| 5,048,279 | 9/1991 | Badaway et al. | 56/320.2 |
| 5,062,257 | 11/1991 | Morris | 56/295 X |
| 5,305,587 | 4/1994 | Johnson | 56/16.9 |
| 5,365,725 | 11/1994 | McCance | 56/295 X |

FOREIGN PATENT DOCUMENTS

| | | |
|---|---|---|
| 611053 | 12/1960 | Canada . |
| 775830 | 1/1968 | Canada ........... 56/295 |
| 1111259 | 10/1981 | Canada ........... 56/58 |
| 1248762 | 1/1989 | Canada ........... 56/53 |
| 2065038 | 7/1990 | Canada . |
| 2075537 | 6/1992 | Canada . |
| 2080993 | 5/1993 | Canada . |
| 2093395 | 7/1994 | Canada . |
| 2060465 | 11/1994 | Canada . |

Primary Examiner—Terry Lee Melius
Assistant Examiner—Heather Schackelford
Attorney, Agent, or Firm—Sand & Sebolt

[57] ABSTRACT

A mulching device which includes a mulching plate formed by a disk provided with a plurality of circumferentially spaced openings disposed inwardly of the periphery of the disk. A cutting blade edge is located forward of a trailing edge of each opening, the cutting edges being axially spaced from a top surface of the disk. The mulching plate can be used in a lawn mower for replacing the conventional mower blade. A mulching adapter includes a hopper having a base for attachment to a top deck of a mower housing, the hopper having a lower tubular portion adapted to project through an opening in the deck, the tubular portion having a lower outlet end for positioning slightly above the path of travel of the cutting edges. The mulching plate is safer than conventional mower blades and achieves effective mulching of even coarse lawn and garden debris by using the power of the small engine of the conventional mower.

21 Claims, 7 Drawing Sheets

MULCHER ATTACHMENT FOR LAWN MOWER

FIELD OF THE INVENTION

This invention relates to a mulching device, and according to one aspect of the invention, to a device which may be utilized to readily adapt a conventional type lawn mower to mulch grass as the grass is being cut or alternatively permit the mulching of debris such as garden plants, weeds, tree branches, etc.

DESCRIPTION OF THE PRIOR ART

There have been developed many different types of blades for rotary mowers to provide a better type of cutting effect. In the main, known rotational type of mowers, whether lawn mowers or larger commercial or agricultural mowers, have a cutting blade normally formed from a single rigid blade member with a pair of radial cutting portions at opposite ends thereof. The cutting action is achieved by a forward cutting edge, and particularly the sharp tip portion of the blade portions, striking the blades of grass, as opposed to the scissor action of the older style reel mowers which provided a preferable cut. The reel mowers, however, were more expensive to produce and difficult to maintain. The cutting tips of the rotary mowers must turn at a high speed in order to accomplish acceptable cutting action and have presented hazardous operating conditions accounting for thousands of injuries annually because of the tips striking the user, and particularly the hands or feet of the user. Also property and personal injuries are frequently caused by the tips flinging objects, such as stones, which strike the user or other persons and windows, etc. which are in the same general area.

As the public has become more concerned about the environment and problems, such as the filling of dump sites, the blade members of rotary mowers have been modified in shape, or components have been developed for adding to the contemporary blade design, so as to cause a further shredding of the grass as it is being cut, thus forming a mulch which more readily decomposes. Also in addition to the development of separate shredders and mulching machines for use with garden and lawn debris, some proposals have been made for modifying lawn mowers to function as a mulcher for such debris. Because of the expense of individual shredders and mulchers, they have not become a common addition to the household for use in lawn and garden care. In view of the design of such mulchers, and particularly the nature of their cutting blades, they utilize relative large engines, and in many cases the character of the mulched material is not fully satisfactory. The proposed structures designed to permit the modification of a normal rotary mower also have not produced a satisfactory mode of operation and quality of mulching so as to be accepted for household yard care.

SUMMARY OF THE INVENTION

It is one object of this invention to provide a blade which is highly effective for mulching.

It is also an object of one aspect of the invention to provide a cutting and mulching plate of a safe design.

According to one aspect of the invention there is provided a mulching plate comprising a disk having means at the center thereof for attachment to a rotating drive shaft. The disk has opposite top and bottom faces and a substantially uninterrupted outer circular periphery. The disk defines a plurality of circumferentially spaced openings inward of the periphery. Each opening has a blade supporting portion at the trailing edge thereof, and a blade edge is disposed adjacent each blade supporting portion in a plane axially spaced from one of the faces of the disk.

According to another aspect of the invention there is provided a separate mulching blade which is designed for attachment to a mulching plate of the type including a disk having front and rear surfaces, the mulching plate being of the type for attachment to a rotating drive shaft and being provided with a plurality of circumferentially spaced openings radially inward of the periphery of the plate, the mulching blade has an intermediate portion defining a flat disk engaging surface on one side thereof, a cutting portion formed integrally with a leading part of the intermediate portion and a tail portion formed integrally with a trailing part of the intermediate portion. The cutting portion which extends at an angle from the intermediate portion in a direction away from the intermediate portion defining the disk engaging surface has a forward cutting edge. The angled cutting portion is thus shaped to project through its respective opening of the disk when the blade is attached to the rear face of the disk so as to dispose the cutting edge in a plane axially spaced from the front surface of the disk. The tail portion extends at an angle from the intermediate portion in a direction from the side of the intermediate portion opposite the disk engaging surface. The tail portion has a trailing edge which is thus disposed axially from the rear surface of the disk when the blade is attached to the disk.

It is also an object of another aspect of the invention to provide a structure which can be used to adopt a lawn mower so that in one phase it functions as a mower to provide a mulched discharge and in another phase it can be utilized as a mulcher for garden debris and the like.

Thus, according to yet another aspect of the invention there is provided a mulching adapter for a rotating lawn mower of the type having a blade housing supported on wheels and defining a top engine mounting deck with a downwardly extending skirt portion which is interrupted to define a side discharge chute. Such a mower has a blade contained within the housing, the blade having a plurality of cutting edges for rotating below the deck and radially inward from the skirt. The adapter includes a hopper having a base defining an outlet attachment means for mounting the hopper on the deck with an outlet opening in the housing above the cutting edges of the blade.

BRIEF DESCRIPTION OF THE DRAWINGS

In the accompanying drawings which illustrate embodiments of the invention by way of examples.

DESCRIPTION OF PREFERRED EMBODIMENTS OF INVENTION

Figure 1:
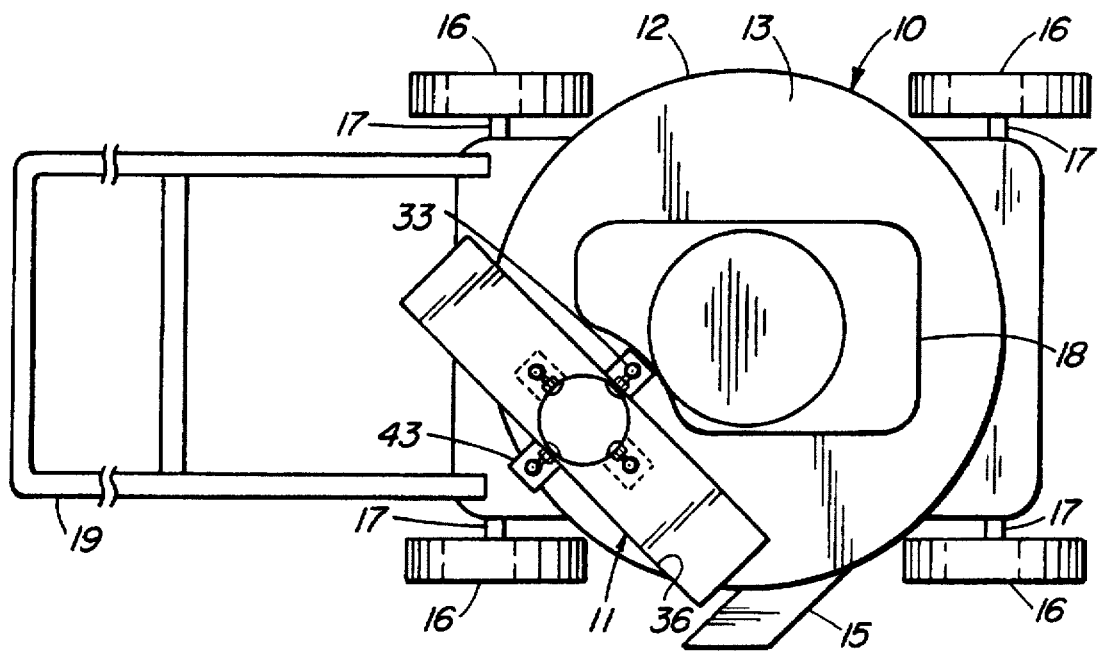
FIG. 1 is a top view of a conventional rotary lawn mower on which there has been mounted a mulching adapter according to the present invention.
Figure 2:
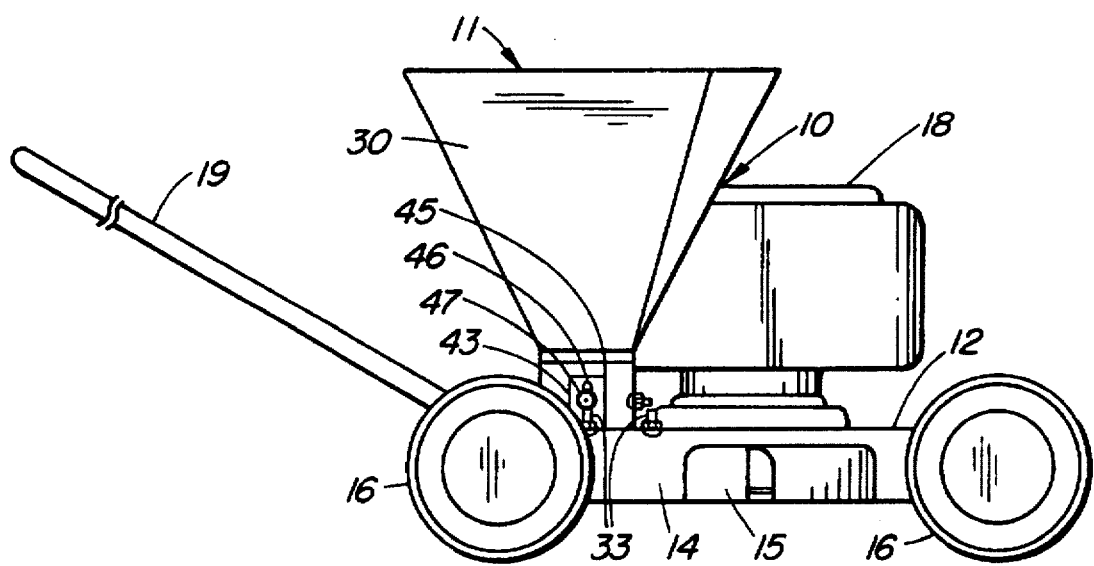
FIG. 2 is a side view of the mower and mulching adapter as shown in FIG. 1.
Figure 3:
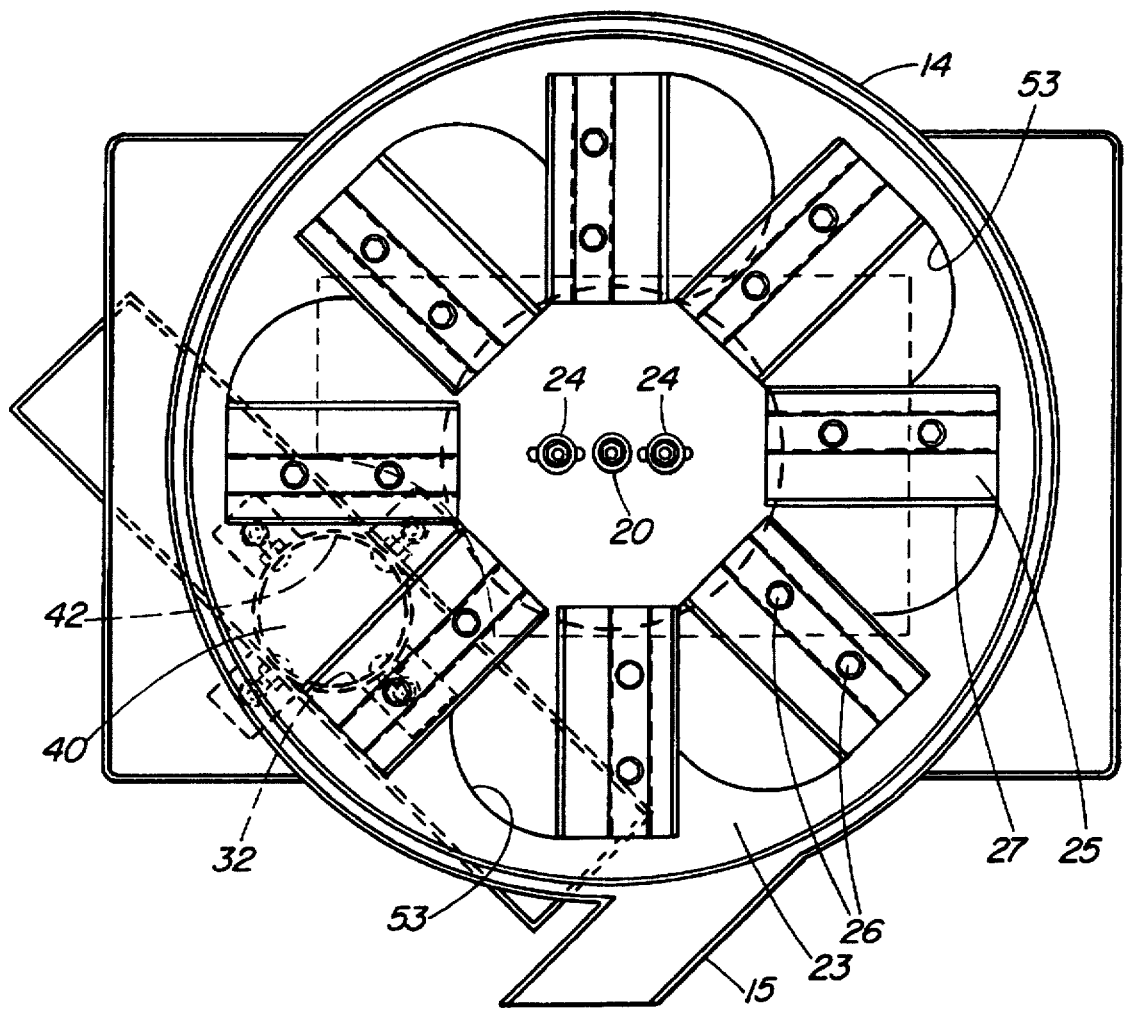
FIG. 3 is a bottom view of the blade housing and showing the mulching plate of the present invention.
Figure 4:
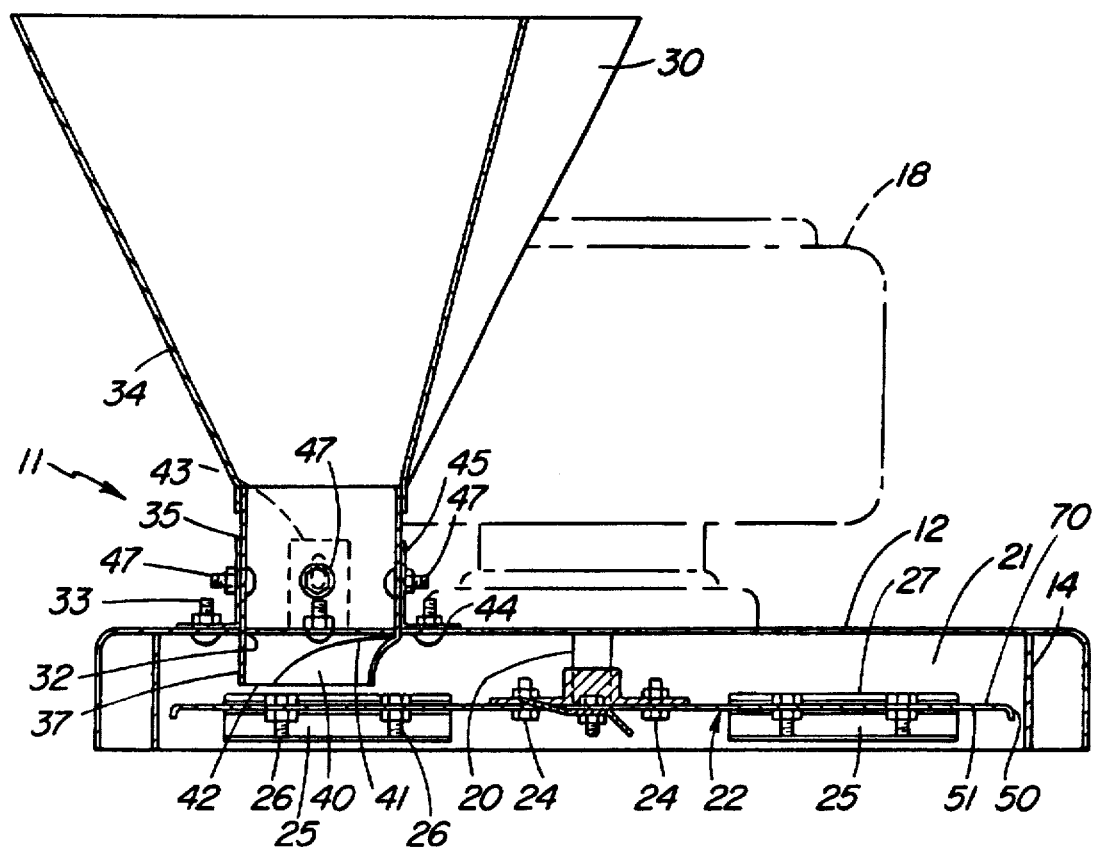
FIG. 4 is a side view of the blade housing with the hopper mounted thereon, but showing the housing and blade in cross-section.
Figure 5:
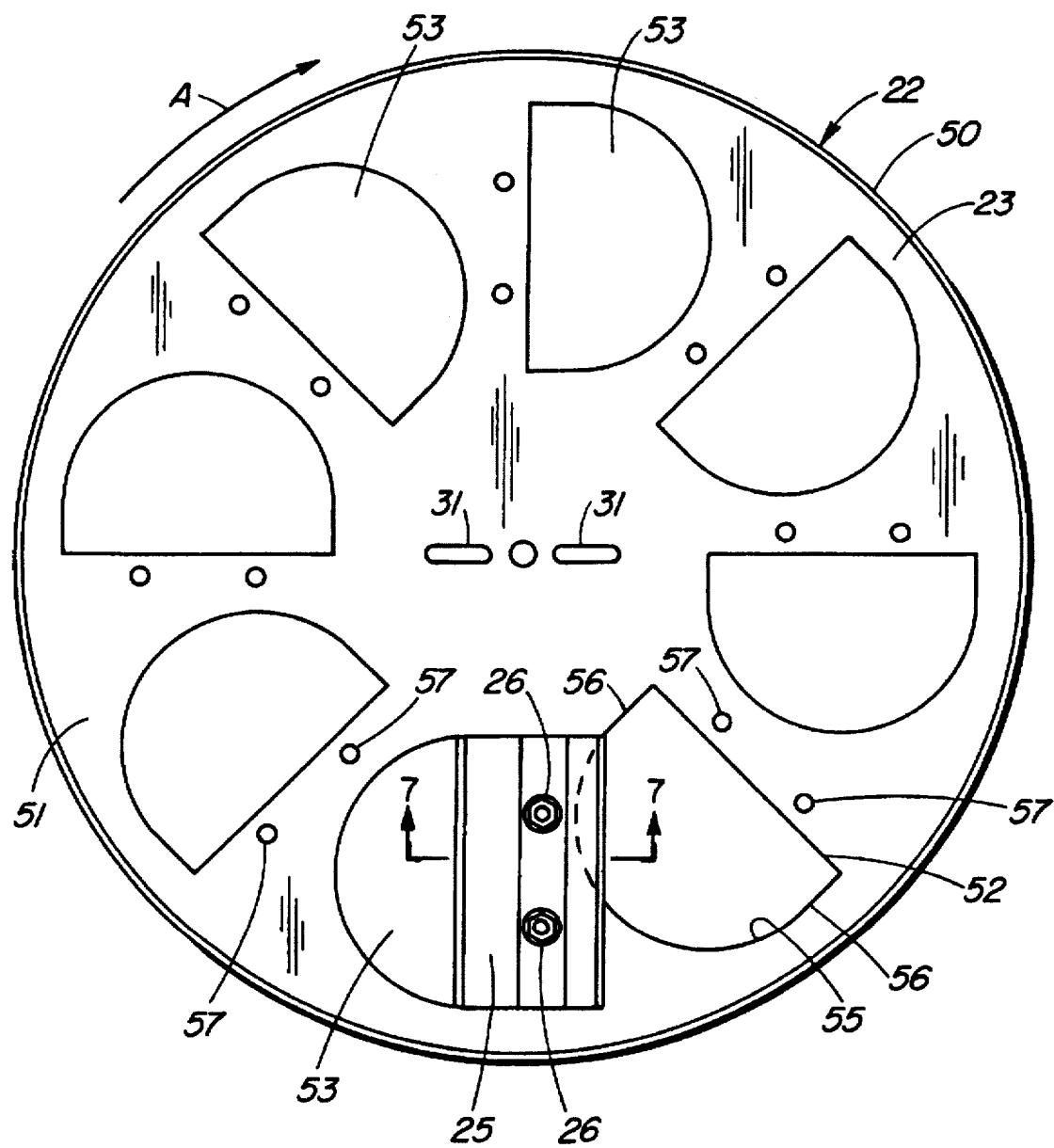
FIG. 5 is a bottom view of the cutting and mulcher plate and showing only one cutting blade in a debris mulching position.

As shown in FIGS. 1 and 2, the reference character 10 denotes a conventional rotary lawn mower on which a mulching adapter 11 of the present invention has been mounted. The lawn mower 10 includes a blade housing 12 which provides a generally horizontal top or engine mounting deck 13 and a downwardly extending skirt 14 which is interrupted to provide a side discharge chute 15. The lawn mower 10 is carried on ground engaging wheels 16 rotatably mounted on axles 17 affixed to the housing 12. A prime mover which may be an electric motor or preferably a gasoline engine 18 is secured to the top of the deck 13 and has a vertical output shaft 20 which extends downward into a cutting chamber 21 containing the grass cutting and mulching plate 22 (FIGS. 3 and 4). An upwardly and rearwardly extending operator's handle 19 is pivotally connected to the upper deck 13 of the housing 12 adjacent a rear portion of the housing.

What has been generally referred to above as a grass cutting and mulching blade or plate 22 is in the form of a circular disk 23 which is mounted coaxially on the outer end of the engine output shaft 20 by way of conventional mounting bolts 24 (FIG. 3), the disk 23 carrying a plurality of individual cutting blade members 25. As will be described in more detail below in the embodiment shown in FIGS. 3 and 4, the cutting blade members 25 are formed as individual elements which are attached to the disk 23 by attachment means, such as bolts 26, and the blade members are mounted on the disk 23 in either a debris mulching mode or a cutting mode. As shown in FIGS. 3 and 4, the blade members 25 are mounted in a debris mulching mode so that a blade cutting edge 27 is disposed above the disk 23.

The mulching adapter of the present invention includes a hopper 30 and the plate 22, the latter of which can be provided for substitution for an elongated conventional blade which is normally present in rotary type lawn mowers. The plate 22 is provided with a pair of bolt openings 31 of the type which are provided for the conventional blade so that to substitute the mulching plate 22 is only necessary to remove the bolts 24 and the conventional blade and then install the plate 22 in its place using the same bolts 24.

Should the lawn mower manufacturer also be a supplier of the mulching adapter of the present invention, the deck 13 may be provided with knock-out portions (not shown) one of which can be readily removed to provide a main opening 32 for the reception of the hopper 30 and four other portions to provide four spaced bolt holes for mounting bolts 33 of the hopper. Otherwise, the opening 32 and the bolt holes can be cut and drilled, respectively, preferably by use of a pattern supplied with the mulching adapter, so that the mulching adapter may be mounted on any conventional rotary lawn mower. Alternatively, of course, the lawn mower may be initially manufactured and sold with what has been termed the mulching adapter 11 already in place.

The hopper 30 includes an upper tapered portion 34 and a lower base in the form of a tubular portion 35. The upper portion 34 is open topped so as to provide a debris receiving inlet 36, and the taper of the portion 34 and its height are sufficient to provide an inlet 36 of a size to conveniently receive bushy material such as tree and shrub branches. The upper portion 34 may be of rectangular shape in cross-section, as shown, or it may be circular or partially circular in cross-section. The lower cylindrical portion 35 again, while being shown as cylindrical, may have other shapes in cross-section, but is preferable of uniform size in cross-section along its length. The lower portion 35 communicates at its upper end with the upper portion 34 so as to provide a debris passageway to the lower end 37 of the lower portion 35 which is spaced a short distance above the circular path of travel of the blade cutting edges 27 of the mulching plate 22. The lower end 37 provides an outlet opening 40 for the debris passing through the hopper 30. As shown in FIG. 4, the wall of the lower portion 35 provides a lower edge 42 which is in a plane perpendicular to the axis of the lower portion 35, and which is thus substantially parallel to the blade cutting edges 37. However, the side of the wall of the lower portion 35, which faces the blade cutting edges 37, may be cut away as shown at 41.

Although not shown, a plate may be pivotally mounted in the hopper 30 preferably in the lower tubular portion 35, in a manner to move to an open position to permit passage of debris being pushed in through the inlet opening 36, but which will pivot back to a debris biting position in the event of movement of the debris in an upward direction. Such a pivoted plate thus prevents debris from experiencing kickback which might prove dangerous to the operator.

The shape of the main opening 32 in the deck 13 of the lawn mower 10 is the same as the outside of the base or lower tubular portion 35 of the hopper 30, except slightly larger, so that when mounting the hopper the lower tubular portion can be readily pushed through the opening 32 until the lower edge 42 thereof is slightly above the blade cutting edges 27 of the mulching plate 22. The hopper is fixed in place by attachment means which includes a plurality of L-shaped mounting brackets 43 formed by a horizontal leg portion 44 and vertical leg portion 45. The lower leg portions 44 of the brackets 43 are affixed to the deck by the mounting bolts 33 which pass through aligned holes in the lower leg portions and the openings in the deck 13 spaced about the main opening 32. The vertical leg portions 45 have elongated slotted openings 46 through which mounting bolts 47 pass, the bolts 47 also extending through holes (not shown) in the wall of the tubular lower portion of the hopper 30. Thus prior to tightening bolts 47, the vertical positioning of the lower tubular portion 35 within the opening 32 can be varied so as to vary the height of the lower end 37 of the lower tubular portion 35 in the chamber 21 above the cutting edges 27 of the mulching plate. During operation of the device it may become desirable to readjust the spacing again, depending on the nature of the debris and/or the type of mulch which the operator wishes to produce.

The disk 23 may be formed from a steel plate, such as from stock of ⅛" thickness, and in the embodiment illustrated, it has at its periphery a flange 50 which projects downwardly a short distance from a rear or bottom surface 51 of the disk at substantially a right angle, i.e. in an axial direction, this flange forming a reinforcing rim portion of the disk. The disk further has a plurality of circumferential equally spaced openings 53 which are spaced radially inward from the periphery of the disk. These openings, together with the bolt holes 31 may be punched from the steel plate, and the flange may be pressed to its depending position simultaneously in the same punching operation. Preferably there are between four and twelve such openings, there being shown eight in the illustrated embodiment, and each opening includes a straight rear trailing edge 52, i.e. the edge which at the rear of the opening when one considers the direction of rotation of the plate as represented by the arrow A. Preferably the trailing edge is on a radial line of the disk 23. The remainder of the opening, i.e. the forward edge 55, is of substantial semi-circular shape except for a pair of short side portions 56 which are perpendicular to the trailing edge 52. Located immediately behind each trailing edge 52 is a pair of bolt holes 57.

Figure 6:
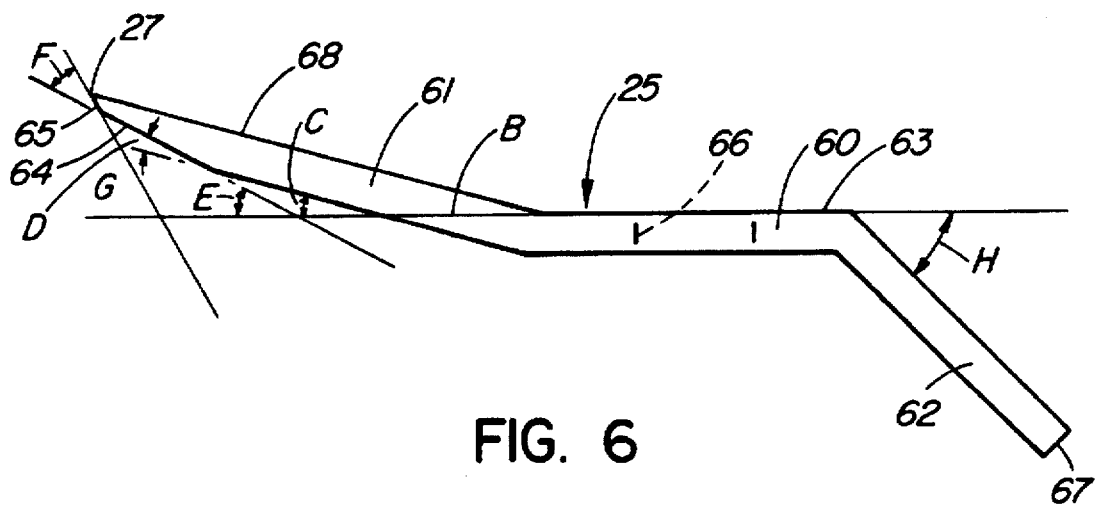
FIG. 6 is an end view of one of an individual cutting blade member.

Referring next to FIG. 6, which is an end view of an individual blade member 25, it may be seen that it consists of integrally formed intermediate portion 60, cutting edge portion 61 and tail portion 62. The intermediate portion has a disk engaging surface 63 disposed in a flat plane represented by the line B. The cutting edge portion 61 projects forwardly from the intermediate portion 60 at an angle C relative to the surface 63. It has been found that when this angle is between about 10° and 20°, the best cutting and mulching effects are achieved. A leading edge 64 of the cutting edge portion 61 is provided with a major bevelled cutting edge surface 64 which is disposed at an angle D relative to the cutting edge portion 61, so that the major bevelled cutting edge surface 64 is at an angle E relative to the surface 63. Preferably this angle E is about 30°. The cutting edge portion 61 is shown as being provided with an extreme outer bevelled cutting edge surface which is disposed at an angle F relative to the major bevelled cutting edge surface 64 so that the extreme outer bevelled edge cutting surface 65 is disposed at an angle G relative to the flat disk engaging surface 63. The angle F has been found to function most effectively if the angle F is approximately 15° whereby the angle G is about 45°. The intersection of the extreme outer bevelled cutting edge surface, with an outer side surface 68 of the cutting edge portion 61 of the blade member provides the blade cutting edge 27.

The tail portion 62 extends rearwardly from a trailing edge of the intermediate portion 60 at an angle so that the tail portion is at an angle H relative to the disk engaging portion and terminates at a trailing edge 67. Preferably the angle H is between about 30° and about 60°.

Figure 7:
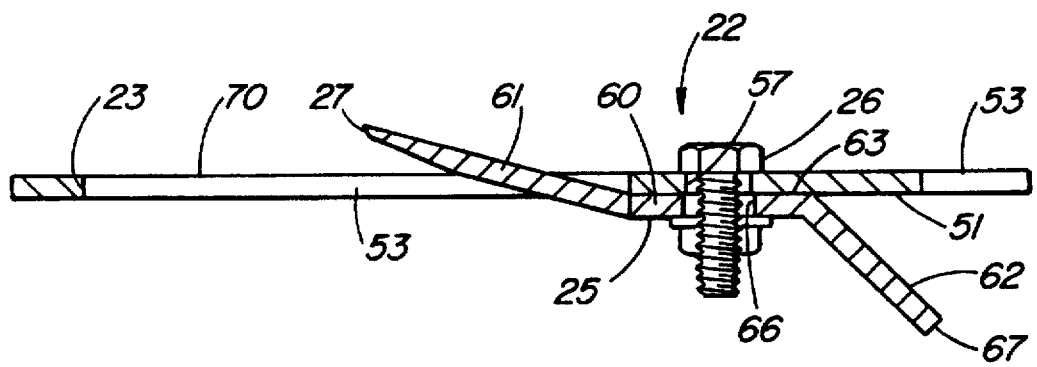
FIG. 7 is an enlarged cross sectional view as seen from line 7—7 of FIG. 5, and wherein the cutting blade member is in a debris mulching mode.

The intermediate portion 60 of the blade member 25 is provided with a pair of bolt holes 66 for receiving bolts 24 which are also received in bolt holes 57 of the disk 23. When the blade members 25 are mounted in the debris mulching mode as illustrated in FIGS. 3 to 5 and FIG. 7, the intermediate portion 60 of the blade member is mounted below the disk 23, as best illustrated in FIG. 7. Accordingly, the disk engaging surface 63 of each blade member engages the bottom surface 51 of the disk 23, and the cutting edge portion of the blade member, which is nearly equal in length to the distance between the side edges 56 of the opening 53, projects through the opening so that blade cutting edge 27 is disposed in a plane spaced axially above a forward or top surface 70 of disk 23. The tail portion 62 of the blade members projects below the disk 23 behind its respective opening 53 so that the trailing edge 67 is axially spaced from the bottom surface 51 of the disk 23.

It can thus be seen that when used in the debris mulching mode the cutting edge 27 of each blade member 25, which is spaced above the top surface 70 of the disk, strikes the debris being pushed through the outlet opening 40 of the hopper 30, and a majority of the severed pieces pass through the openings 53 to the area below the disk 23 in the cutting chamber 21 of the blade housing 12.

Figure 8:
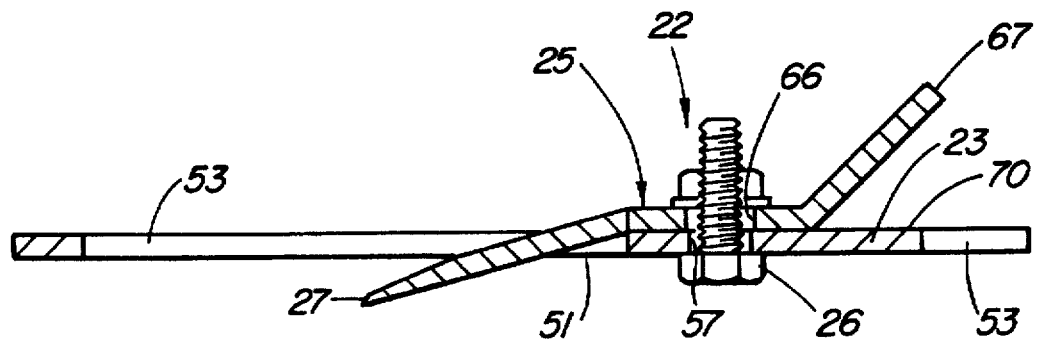
FIG. 8 is a cross-sectional view similar to FIG. 7, but showing the blade members mounted in a mowing mode.

In order to convert the plate 22 from the mulching mode to the mowing mode the blade members 25 are each detached from the disk 23 by removing the bolts 26, and each blade member is inverted so that the disk engaging surface is placed against the top surface 70 of the disk behind the opening 53 so that the cutting edge portion 61 projects downwardly and forwardly through, the opening as shown in FIG. 8. The bolts 26 are replaced to fix the blade members in this position whereby the blade cutting edges 27 are spaced in a plane axially spaced below the bottom surface 51 of the disk and the trailing edge 67 of the blade members are in a plane spaced above the top surface 70 of the disk.

The above described mulching plate design is effective in providing a fine mulch and capable of mulching even heavy wood branches, as well as all other types of garden debris in conjunction with conventional lawn mowers which have relatively small engines in comparison to known mulchers. Moreover, the feeding rate can be relatively fast. The tail design for the cutting blades also ensures an air and debris flow which maintains the cutting chamber 21 completely clear. The mulching plate design is also of much safer design than the types of blades conventionally used as it does not have high velocity sharp tips at its outer periphery, but a smooth edge which is not of a sharp nature.

Although reference is made to the blade being converted to a mowing mode, as opposed to the mulching mode, it should be appreciated that when used as a lawn mower with the blade members arranged as shown in FIG. 8, this mode might better be termed a mowing/mulcher mode as the plate design provides a highly effective mulching of the cut grass. Also, it has been found that in view of the air pumping action provided by the shape of the blade members in combination with the manner they are mounted in relation to the openings in the disk 23, its cutting action is superior to that of the conventional mower blade as it appears to pull the grass up to the cutting edge 27. Again, when used as a mower the design of the plate 23 is much safer than the conventional mower blade design.

While the plate 22 has been shown as used in relation to a common household lawn mower, it is apparent, that on a larger scale, it can provide the same type of advantages if used in agricultural or industrial type rotary cutters. Moreover, in the mulching mode, such a plate may provide an effective device for cutting the stocks or straws being expelled from an agricultural combine.

Figure 9:
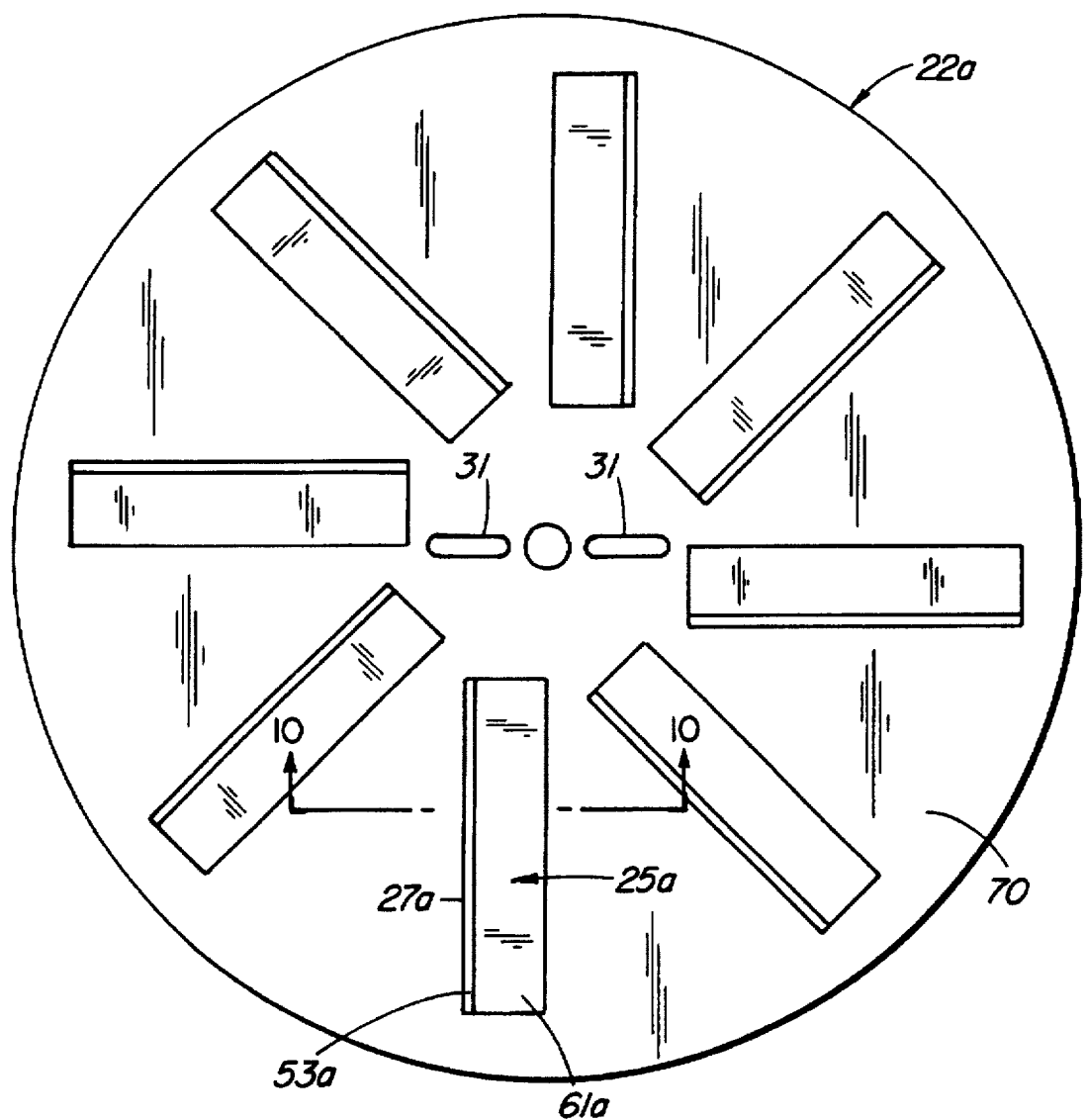
FIG. 9 is a top view of another embodiment of a cutting and mulching plate.
Figure 10:
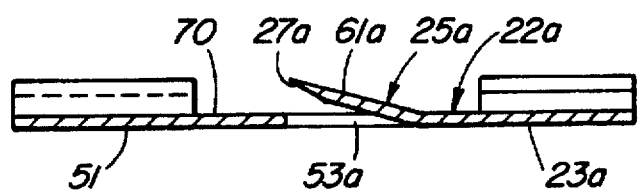
FIG. 10 is a cross-sectional view as seen from the line 10—10 of FIG. 9.

Turning now to the embodiment of the plate 22a of FIGS. 9 and 10, it can be seen that the blade members 25a are formed integrally with disk 23a. In this embodiment the blade members 25a are punched from the steel plate thereby forming the opening 23a and at the same time providing a portion 61a corresponding to the forwardly projecting cutting edge portion 61 of the above embodiment. The forward edge 27a of the portion 61a of the blade member may have bevelled edge surfaces corresponding to those described for the individual cutting blades 25. Thus, the blade members project from the rear edge of the openings 53a and the material at the trailing edge of the openings effectively provide the blade supporting portion of the disk 23a. When the punching operation is being carried out to form the portion 61a, a portion of the disk in front of the blade portion may be punched out completely to form an opening 53a having the same outline as the opening 53 of the previous embodiment.

Instead of detaching separate blade members to convert the plate 22a from the mulching mode as shown in FIG. 9, a second mowing plate may be provided for substitution when it is desired to use the lawn mower for mowing instead of mulching garden debris. The mowing plate would be similar to that shown as plate 22a, except the blade members would project forwardly and downwardly below the lower surface 51, instead of forwardly and upwardly as shown for blade members 25a in FIG. 9. Thus, it would be a matter of simply substituting one complete plate for another. While such an arrangement would be more economical to produce and actually take less time to convert from one mode to another, it does not have some of the preferred features of the plate 22, such as the effects provided by the tail portion 62 of the blade members 25.

Figure 11:
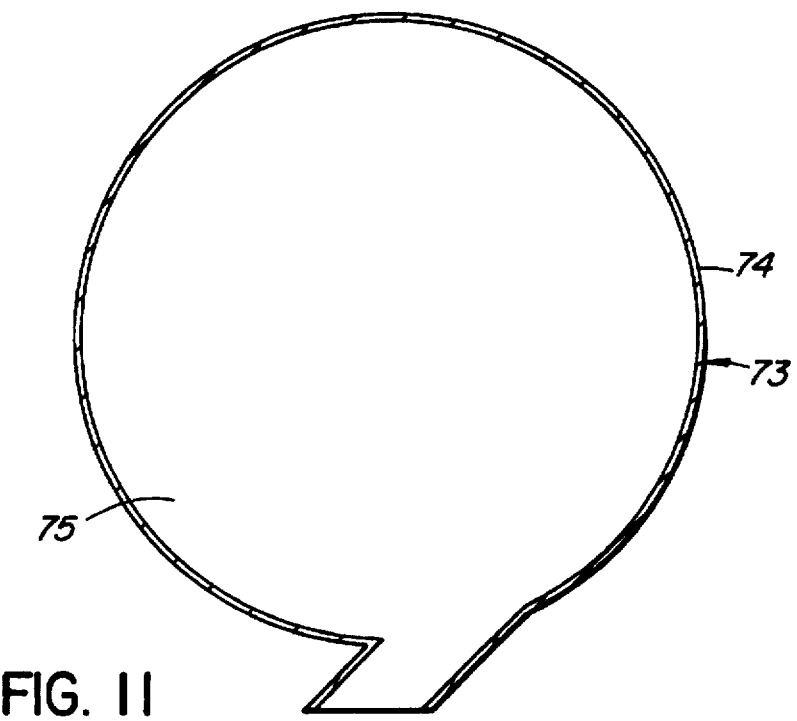
FIG. 11 is a top view of a shroud which may form part of the mulching adapter of the present invention.
Figure 12:
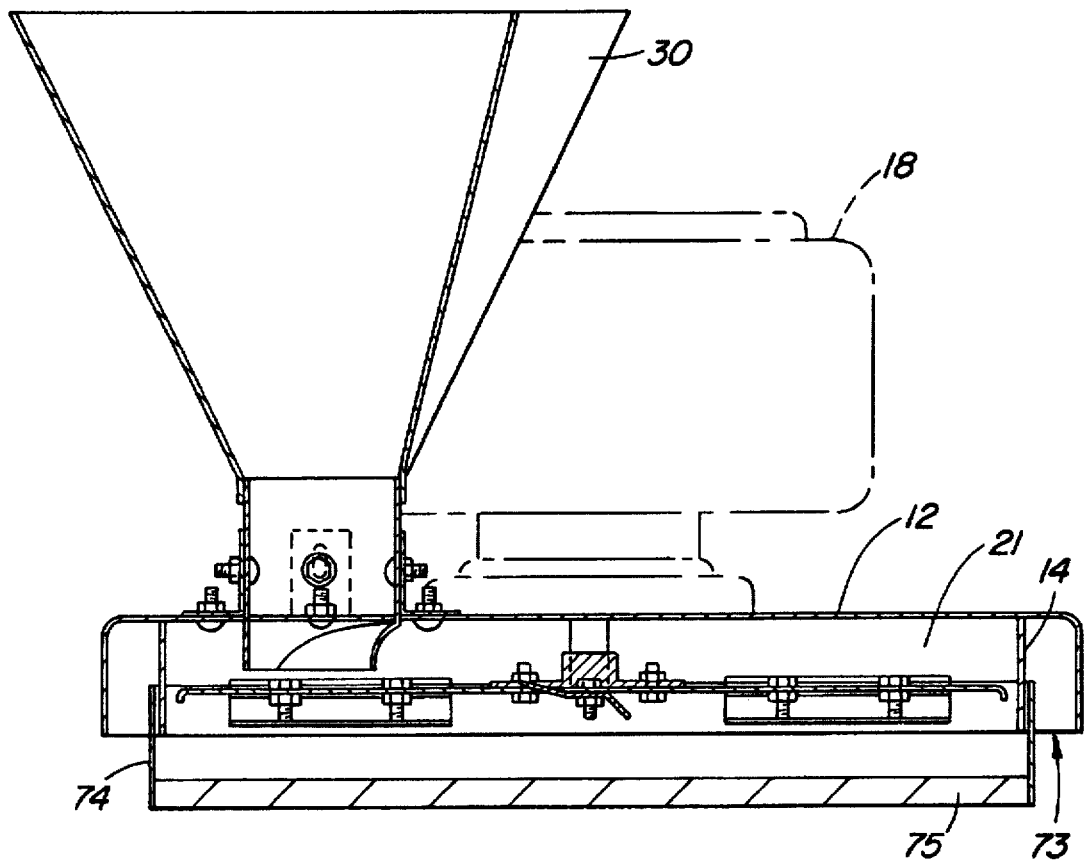
FIG. 12 is a view similar to FIG. 4, but showing the shroud of FIG. 11 in place.

While it is possible to use the mulching adapter as described above when the lawn mower is sitting on the ground or, for example, on a paved surface, it may be necessary to clean the area after the mulching process. A majority of the mulched material will collect outwardly of the opening of the discharge chute 15 of the lawn mower, but some which blows from under the lower edge skirt 14, will accumulate around the mower. In order to collect the mulched material in a more concentrated area, it is possible to utilize a shroud device 73 as shown in FIGS. 11 and 12. As illustrated, the shroud device 73 simply comprises a long strip of relatively flexible material forming a wall 74, which is wrapped around and secured to the edge of a rigid base member 75. The base member 75 shares the outline of the skirt 14 which defines the cutting chamber 21 of the lawn mower, but the base member includes a portion corresponding in shape to the discharge chute 15. The height of the wall 74 is sufficient to hold the mower wheels slightly above the ground when the shroud is placed around the skirt 14. The upper edge of the wall 74 may be tabbed (not shown) so as to limit the extent it slides up on the skirt 14. In fact by forming appropriate tabs along the upper edge of the wall so as to in effect provide clips which fasten the wall to the skirt, it is not essential to include the base 75, because the lower edge of the wall 74 may rest on the ground to form a completely enclosed chamber.

With the use of a shroud device 73 all of the mulch produced within the cutting chamber 21 is blown continuously out of the discharge chute 15 of the mower so that it collects in a relatively concentrated pile.

While the lawn mower can be used in the mowing mode while the hopper 30 remains mounted on the deck 13, it is possible to include a closure plate (not shown) with the mulching adapter. Accordingly, if the law mower is to be used extensively for only mowing, it is possible to remove bolts 33 and the hopper, and then to place the closure plate over the opening 32 and secure it in place by reinstalling the bolts 33.

While a number of features and embodiments have been described above as examples of the present invention, alternatives, which are within the spirit of the invention as defined in the appending claims, will be obvious to those skilled in the art.

What is claimed is:

1. A mulching plate comprising a disk having means at the center thereof for attachment to a rotating drive shaft,
    said disk having opposite top and bottom faces and a substantial uninterrupted outer circular periphery,
    a plurality of circumferentially spaced openings in said disk radially inward of the periphery,
    each opening having a blade supporting portion adjacent an edge rearward of said opening in relation to a direction of rotation thereof, and
    a plurality of blade members each formed separately of said disk and each being affixed to said disk at said blade supporting portion rearward of one of said openings,
    said blade members defining cutting edges in a common plane axially spaced from said top surface of said disk,
    each blade member having an intermediate portion defining a disk engaging portion, a cutting portion extending forwardly of said intermediate portion in relation to said direction of rotation and at an angle relative of said intermediate portion.

2. A mulching plate as defined in claim 1, wherein said edge rearward of each of said openings in said disk is at least in part defined by a straight edge.

3. A mulching plate as defined in claim 2, wherein said disk has a central portion formed of a flat plate of substantially uniform thickness and is provided with a reinforcing rim portion projecting at a substantial right angle to said flat plate, and wherein said straight edge rearward of said opening is disposed substantially on a radial line of said disk.

4. A mulching plate as defined in claim 1, wherein said blade member has a tail portion extending rearwardly of said intermediate portion in relation to said direction of rotation and at an angle relative to said intermediate portion, said disk engaging portion engaging said bottom face of said disk adjacent said edge rearward of said opening, and wherein said cutting portion projects through said opening to thereby dispose said cutting edge in spaced relation to said top face, said tail portion providing a trailing edge spaced axial from said bottom surface of said disk.

5. A mulching plate as defined in claim 4, wherein each blade member is affixed to said disk with a detachable fastening means for alternatively connecting said blade member to said disk in a mowing mode.

6. A mulching plate as defined in claim 5, wherein said disk engaging portion of said intermediate portion of said blade member in said mowing mode engages said top face of said disk adjacent said edge rearward of said opening, and said cutting portion projects through said opening to thereby dispose said cutting edge in spaced axial relation below said bottom face of said disk in said mowing mode.

7. A mulching plate as defined in claim 4, wherein said disk engaging portion of said blade member has a flat disk engaging surface on one side thereof, said tail portion extends at an angle of between 30° and 60° relative to the flat disk engaging surface, and said cutting portion extends at an angle of between 10° and 20° relative to said flat disk engaging surface; said cutting portion being defined by a major bevelled cutting edge surface disposed at an angle relative to said cutting portion, said major bevelled edge surface being disposed approximately 30° relative to said flat disk engaging surface; and wherein said cutting portion is provided with an extreme outer bevelled cutting edge surface disposed at an angle of approximately 15° relative to said major bevelled cutting edge surface thereby placing said extreme outer bevelled cutting edge surface in a plane disposed at approximately 45° relative to said flat disk engaging surface of said blade member.

8. A mulching adapter for a rotary lawn mower of the type having a blade housing supported on wheels and defining a top engine mounting deck and a downwardly extending skirt portion for containing a blade attached to a lower portion of a vertical drive shaft of a prime mover of said lawn mower, said skirt portion being interrupted to define a side discharge chute,
    said adapter including:

a hopper having a base defining an attachment means for mounting said hopper on said deck, said base having an outlet opening in alignment with an opening in said deck, said hopper having a debris receiving inlet at a location above said deck and providing a passage for debris from said inlet to said outlet, a mulching plate for replacement of a conventional lawn mower blade, said plate including a disk having means at the center thereof for attachment to said drive shaft, said disk having opposite top and bottom faces and a substantial uninterrupted outer circular periphery, a plurality of circumferentially spaced openings in said disk radially inward of the periphery for circumferential passage beneath said opening in said deck, each opening having a blade supporting portion adjacent an edge rearward of said opening in relation to a direction of rotation of said plate, and a blade cutting edge positioned forward of each blade supporting portion in relation to said direction of rotation and axially spaced from one of said faces of the disk, each blade edge being defined by a blade member formed separately of said disk and affixed to said disk at said blade supporting portion rearward of each opening, said blade member having an intermediate portion defining a disk engaging portion and a cutting portion extending forwardly at an angle relative to said intermediate portion and thereby providing said cutting edge in a plane axially spaced above said top surface of said disk in a mulching mode.

9. A mulching adapter as defined in claim 8, wherein said disk engaging portion of said blade member engages said bottom face of said disk adjacent said edge rearward of said opening, said cutting portion projecting through said opening to thereby dispose said cutting edge spaced in relation to said top face in said mulching mode.

10. A mulching plate as defined in claim 8, wherein there are between four and twelve openings each provided with an associate blade member.

11. A mulching plate as defined in claim 8, wherein each blade member is affixed to said disk with a detachable fastening means for alternatively connecting said blade member to said disk in a mowing mode.

12. A mulching adapter as defined in claim 11, wherein said blade member includes a tail portion extending rearwardly of said intermediate portion in relation to said direction of rotation of said plate, said tail portion extending at an angle relative to said intermediate portion and providing a trailing edge spaced of said tail portion spaced above said top surface of said disk in said mowing mode.

13. A mulching plate as defined in claim 12, wherein said tail portion extends at an angle of between 30° and 60° relative to the disk engaging portion.

14. A mulching adapter as defined in claim 12 and wherein said disk engaging face of said intermediate portion of said blade member in said mowing mode engages said top face of said disk adjacent said edge rearward of said opening, said cutting portion projecting through said opening to thereby dispose said cutting edge in spaced axial relation below said bottom face of said disk in said mowing mode.

15. A mulching plate as defined in claim 8 wherein said cutting portion extends at an angle of between 10° and 20° relative to said disk engaging portion.

16. A mulching plate as defined in claim 15 wherein said cutting edge of said cutting portion is provided with a major bevelled cutting edge surface disposed at an angle relative to said cutting portion, said major bevelled edge surface being disposed approximately 30° relative to said disk engaging portion.

17. A mulching blade for attachment to a mulching plate of the type including a disk having front and rear surfaces and means at the center for attachment to a rotating drive shaft and being provided with a plurality of circumferentially spaced openings radially inward of the periphery thereof;

said blade having an intermediate portion defining a flat disk engaging surface on one side thereof, a cutting portion formed integrally with a leading part of said intermediate portion and a tail portion formed integrally with a trailing part of the intermediate portion, said cutting portion having a cutting edge disposed forwardly of said intermediate portion in a direction of rotation of said mulching plate, said cutting portion extending from said intermediate portion in an angular direction from a plane of the side of said intermediate portion defining said disk engaging surface to thereby project through one of said openings of said disk when attached to said rear face of said disk and to dispose said cutting edge in a plane axially spaced from the front surface of the disk, said tail portion extending angular from said intermediate portion in a direction from a plane of a side of said intermediate portion opposite said disk engaging surface, said tail portion having a trailing edge disposed axially spaced from said rear surface of said disk when said blade is attached to said disk.

18. A mulching blade as defined in claim 17, wherein said tail portion extends at an angle of between 30° and 60° relative to the flat disk engaging surface, said cutting portion extends at an angle of between 10° and 20° relative to said flat disk engaging surfaces; wherein said leading edge of said cutting portion is provided with a major bevelled cutting edge surface disposed at an angle relative to said cutting portion, said major bevelled edge surface being disposed approximately 30° relative to said flat disk, and wherein said cutting portion is provided with an extreme outer bevelled cutting edge portion disposed at an angle of approximately 15° relative to said major bevelled cutting edge surface thereby placing said extreme outer bevelled cutting edge in a plane disposed at approximately 45° relative to said flat disk engaging surface of said blade member.

19. A mulcher adapter for a rotary lawn mower of the type having a blade housing supported on wheels and defining a top engine mounting deck and a downwardly extending skirt portion for containing a blade attached to a lower portion of a vertical drive shaft of a prime mover of said lawn mower, said skirt portion being interrupted to define a side discharge chute, said adapter including:

a hopper having a base defining an attachment means for mounting said hopper on said deck, said base having an outlet opening in alignment with an opening in said deck, said hopper including an upper tapered portion and a lower tubular portion for reception in said opening in said deck, said lower tubular portion forming said base, said attachment means defined by said base including means for connecting said lower tubular portion to said deck surrounding said opening in said deck, said hopper having a debris receiving inlet at a location above said deck and providing a passage for debris from said inlet to said outlet, a mulching plate for replacement of the conventional lawn mower blade, said plate including a disk having means at the center thereof for attachment to said drive shaft said disk having opposite top and bottom faces and a substantial uninterrupted outer circular periphery, a plurality of circumferentially spaced openings in said disk radially inward of the periphery for circumferential passage beneath said opening in said deck, each opening having a blade supporting portion adjacent an edge rearward of said opening in relation to a direction of rotation of said plate, and a blade cutting edge positioned forward of each blade supporting portion in relation to said direction of rotation and thus providing a plurality of cutting edges axially spaced from one of said faces of the disk, a lower end of said tubular member having a lower end edge defining said outlet opening of said hopper, said lower end edge being in a plane above and substantially parallel to said cutting edges of said mulching plate, a portion of said lower end of said tubular member facing the direction of travel of said cutting edges upon rotation of said plate being cut away.

20. A mulching adapter for a rotary lawn mower of the type having a blade housing supported on wheels and defining a top engine mounting deck and a downwardly extending skirt portion for containing a blade attached to a lower portion of a vertical drive shaft of a prime mover of said lawn mower, said skirt portion being interrupted to define a side discharge chute, said adapter including:

a hopper having a base defining an attachment means for mounting said hopper on said deck, said base having an outlet opening in alignment with an opening in said deck, said hopper including an upper tapered portion and a lower tubular portion for reception in said opening in said deck, said lower tubular portion forming said base, said attachment means defined by said base including means for connecting said lower tubular portion to said deck surrounding said opening in said deck, said hopper having a debris receiving inlet at a location above said deck and providing a passage for debris from said inlet to said outlet, a mulching plate for replacement of a conventional lawn mower blade, said plate including a disk having means at the center, thereof for attachment to said drive shaft said disk having opposite top and bottom faces and a substantial uninterrupted outer circular periphery, a plurality of circumferentially spaced openings in said disk radially inward of the periphery for circumferential passage beneath said opening in said deck, each opening having a blade supporting portion adjacent an edge rearward of said opening in relation to a direction of rotation of said plate, and a blade cutting edge positioned forward of each blade supporting portion in relation to said direction of rotation and thus providing a plurality of cutting edges axially spaced from one of said faces of the disk, a lower end of said tubular member having a lower end edge defining said outlet opening of said hopper, said lower end edge being in a plane disposed within said blade housing and immediately above and substantially parallel to said cutting edges of said mulching plate.

21. A mulching adapter for a rotary lawn mower of the type having a blade housing supported on wheels and defining a top engine mounting deck and a downwardly extending skirt portion for containing a blade attached to a lower portion of a vertical drive shaft of a prime mover of said lawn mower, said skirt portion being interrupted to define a side discharge chute, said adapter including:

a hopper having a base defining an attachment means for mounting said hopper on said deck, said base having an outlet opening in alignment with an opening in said deck, said hopper including an upper tapered portion and a lower tubular portion for reception in said opening in said deck, said lower tubular portion forming said base, said attachment means defined by said base including means for connecting said lower tubular portion to said deck surrounding said opening in said deck, said hopper having a debris receiving inlet at a location above said deck and providing a passage for debris from said inlet to said outlet, a mulching plate for replacement of the conventional lawn mower blade, said plate including a disk having means at the center thereof for attachment to said drive shaft said disk having opposite top and bottom faces and a substantial uninterrupted outer circular periphery, a plurality of circumferentially spaced openings in said disk radially inward of the periphery for circumferential passage beneath said opening in said deck, each opening having a blade supporting portion adjacent an edge rearward of said opening in relation to a direction of rotation of said plate, and a blade cutting edge positioned forward of each blade supporting portion in relation to said direction of rotation and thus providing a plurality of cutting edges axially spaced from one of said faces of the disk, a lower end of said tubular member having a lower end edge defining said outlet opening of said hopper, said lower end edge being in a plane above and substantially parallel to said cutting edges of said mulching plate, said attachment means including adjustment means for permitting selected axial movement of said lower tubular portion whereby spacing between said lower end edge and said cutting edges may be varied.

* * * * *

UNITED STATES PATENT AND TRADEMARK OFFICE
CERTIFICATE OF CORRECTION

PATENT NO. : 5,626,008
DATED : May 6, 1997
INVENTOR(S): Michael T. Puskar

It is certified that error appears in the above-identified patent and that said Letters Patent are hereby corrected as shown below:

Item [30]  Foreign Application Priority Data

April 4, 1995 [CA]  Canada ..................2,141,151 should be inserted after item [22] on the Title page.

Signed and Sealed this

Thirtieth Day of September, 1997

Attest:

BRUCE LEHMAN

Attesting Officer

Commissioner of Patents and Trademarks